W. G. CALLENDER.
FISH STRINGER DEVICE.
APPLICATION FILED APR. 16, 1909.

936,701.

Patented Oct. 12, 1909.

WITNESSES
Herbert S Jones.
Minnie Saylor.

INVENTOR
Ward G. Callender
BY
Van C. Cook
ATTORNEY

UNITED STATES PATENT OFFICE.

WARD G. CALLENDER, OF MANSFIELD, OHIO.

FISH-STRINGER DEVICE.

936,701.  Specification of Letters Patent.  Patented Oct. 12, 1909.

Application filed April 16, 1909. Serial No. 490,432.

*To all whom it may concern:*

Be it known that I, WARD G. CALLENDER, a citizen of the United States, residing at Mansfield, in the county of Richland and State of Ohio, have invented certain new and useful Improvements in Fish-Stringer Devices, of which the following is a full, clear, and exact description, reference being had to the accompanying drawings, forming a part thereof.

My invention relates to improvements in caring for and handling fish caught by the angler; and it consists in the novel arrangements and combination of parts more fully set forth in the specifications and pointed out in the claim.

The object of my invention is to construct a device for the convenient, safe and easy mode of handling and caring for fish caught by the angler, the device being characterized by simplicity of construction, cheapness and durability.

In detail my invention may be described as follows:—

Figure 1:
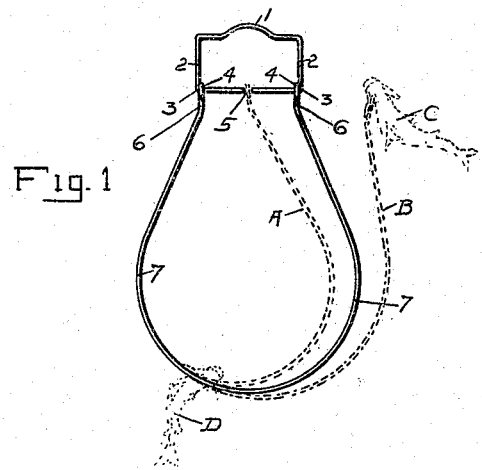

Referring to the drawings, Figure 1. represents my fish stringer device complete and the method of operation.

Figure 2:
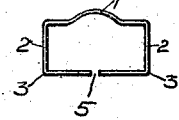

Fig. 2. represents the handle of my device and is formed in a rectangular shape, the angles at the base of the handle are right angles 3, at the center of the top of the handle is a small curve 1 for the purpose of attaching a rope, in the center of the base of the handle there is a small open space 5 about one-half inch in length.

Figure 3:
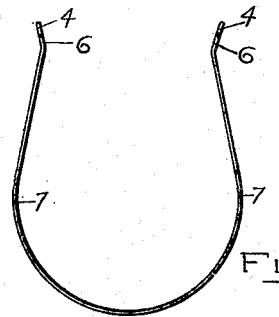

Fig. 3. represents the stringer and is made of good stable spring material and is formed in a general oval shape 7, an eye 4 is constructed on each end of the stringer, about two inches at each end 6 of the stringer is formed so that when the stringer is attached to the handle that portion of the stringer becomes parallel with the sides 2 of the handle.

Figure 4:
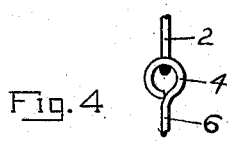

Fig. 4. represents the eye on each end of the stringer, which are constructed by forming the ends of the stringer into an oval shape so that the aperture formed is slightly larger than the diameter of the material used in the base of the handle.

Fig. 1. shows my fish stringer device in operation, which may be described as follows:—By pressing either end of the stringer to the open space in the center of the handle, this end of the stringer may be detached from the handle, and passed through the gill and mouth of the fish, then by pressing this end of the stringer back to the open space in the base of the handle and releasing the pressure the eye on this end of the stringer will pass over the material in the base of the handle to its original position, and again the stringer and handle become attached and the fish securely fastened to the stringer.

It is of course apparent that I may depart from the details here shown without affecting the nature or spirit of my invention.

Having described my invention what I claim is:

In a device of the class described, in combination, a handle, said handle comprising a grasping portion, integral ends at right angles to said grasping portion, integral base portions at right angles to said ends, the terminals of the base portions being separated from each other leaving a space therebetween; a stringer device formed of spring material, having eyes formed at its ends, said eyes being adapted to be inserted in the space between the terminals of the base portions of the handle and detachably engage said base portions.

In testimony whereof I affix my signature in the presence of two witnesses.

WARD G. CALLENDER.

Witnesses:
R. V. SAWHILL,
J. W. TRUKA.